United States Patent
Conrady et al.

(10) Patent No.: US 12,503,026 B2
(45) Date of Patent: Dec. 23, 2025

(54) VIBRATION UNIT, SEAT CUSHION AND METHOD FOR PRODUCING A SEAT CUSHION

(71) Applicant: Ford Global Technologies, LLC, Dearborn, MI (US)

(72) Inventors: Heiko Conrady, Düsseldorf (DE); Sebastian Meyer, Monheim am Rhein (DE)

(73) Assignee: Ford Global Technologies, LLC, Dearborn, MI (US)

( * ) Notice: Subject to any disclaimer, the term of this patent is extended or adjusted under 35 U.S.C. 154(b) by 784 days.

(21) Appl. No.: 17/901,020

(22) Filed: Sep. 1, 2022

(65) Prior Publication Data

US 2023/0076252 A1    Mar. 9, 2023

(30) Foreign Application Priority Data

Sep. 3, 2021   (DE) .......................... 102021122823.9

(51) Int. Cl.
*A61M 21/00*   (2006.01)
*B60N 2/90*    (2018.01)

(52) U.S. Cl.
CPC ............. *B60N 2/976* (2018.02); *A61M 21/00* (2013.01); *A61M 2021/0022* (2013.01)

(58) Field of Classification Search
CPC ............................................. A61M 2021/0022
See application file for complete search history.

(56) References Cited

U.S. PATENT DOCUMENTS

| | | | |
|---|---|---|---|
| 4,175,552 A * | 11/1979 | Johnson ............. | A61H 23/0236 601/46 |
| 5,022,384 A | 6/1991 | Freels et al. | |
| 2017/0028163 A1 * | 2/2017 | Onuma .................. | B60N 2/914 |
| 2018/0193512 A1 * | 7/2018 | Antonino ........... | A61H 23/0236 |
| 2020/0139870 A1 * | 5/2020 | Mergl ..................... | G06F 3/165 |

* cited by examiner

*Primary Examiner* — Thaddeus B Cox
(74) *Attorney, Agent, or Firm* — Vichit Chea; Price Heneveld LLP

(57) ABSTRACT

A housing for a vibration unit which can be arranged on a seat cushion of a vehicle seat and is intended to generate a haptically detectable signal at the vehicle seat. In order to enhance the driving experience of an occupant, in particular a driver, of a vehicle, the housing has an edge-free surface and at least one housing opening, which is permeable to sound waves.

6 Claims, 2 Drawing Sheets

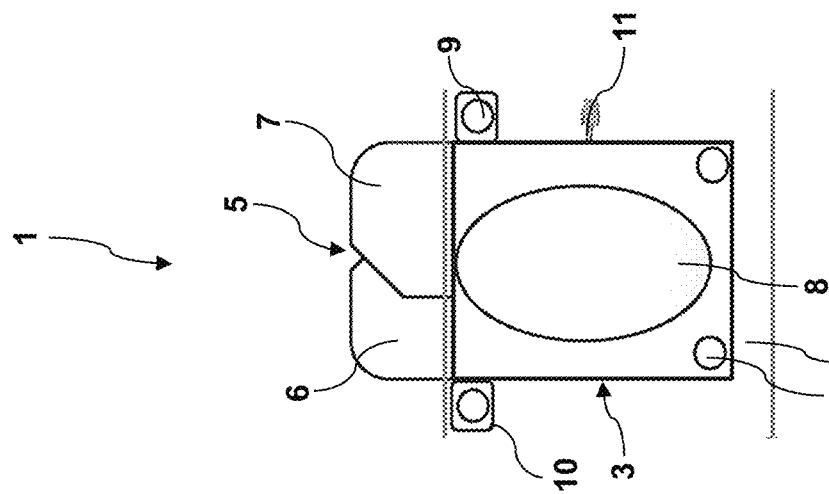
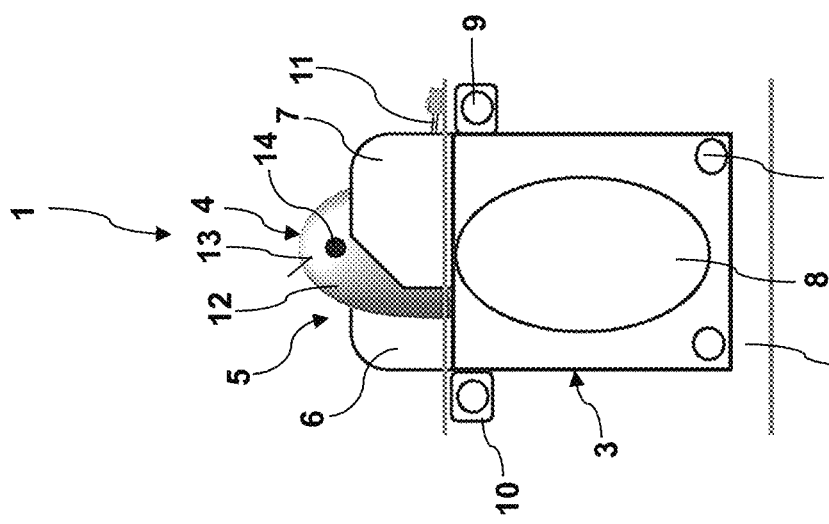
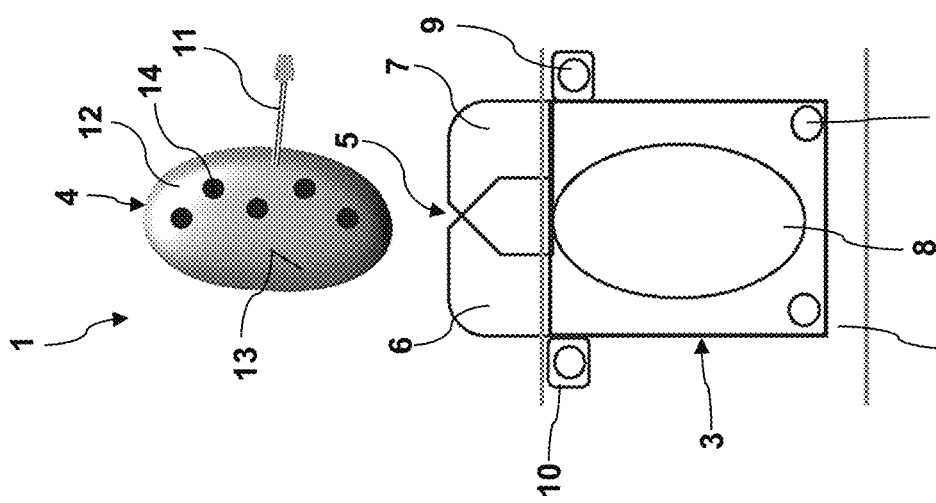

VIBRATION UNIT, SEAT CUSHION AND METHOD FOR PRODUCING A SEAT CUSHION

CROSS-REFERENCE TO RELATED APPLICATION

This application claims foreign priority benefits under 35 U.S.C. § 119(a)-(d) to German Patent Application No. 102021122823.9 filed on Sep. 3, 2021, which is hereby incorporated by reference in its entirety.

FIELD OF THE DISCLOSURE

The present disclosure generally relates to a vehicle seat cushion, and more particularly relates to a vibration unit for generating a haptically detectable signal at a seat cushion of a vehicle seat, having at least one electrically controllable vibration device for generating vibrations. The disclosure further relates to a seat cushion for a vehicle seat and a method for producing a seat cushion for a vehicle seat.

BACKGROUND OF THE DISCLOSURE

The practice of installing a vibration unit in a vehicle on a vehicle component which touches the body of a person sitting in the vehicle is generally known. Owing to the activation of such a vibration unit, this generates vibrations at the vehicle component which can be perceived haptically by the person, for example in order to give the person an indication or an instruction. It would be desirable to enhance the haptic driving experience of an occupant, such as the driver of a vehicle.

SUMMARY OF THE DISCLOSURE

According to a first aspect of the present disclosure, a vibration unit for generating a haptically detectable signal at a seat cushion of a vehicle seat is provided. The vibration unit includes at least one electrically controllable vibration device for generating vibrations, and a housing completely accommodating the at least one electrically controlled vibration device and configured to be arranged on the seat cushion of the vehicle seat such that the at least one electrically controllable vibration device is intended to generate a haptically detectable signal at the seat cushion, the housing having an edge-free surface and at least one housing opening, which is permeable to sound waves.

According to a second aspect of the present disclosure, a seat cushion for a vehicle seat is provided. The seat cushion including at least one electrically controllable vibration device for generating vibrations, and a housing completely accommodating the at least one electrically controlled vibration device and configured to be arranged on the seat cushion of the vehicle seat such that the at least one electrically controllable vibration device is intended to generate a haptically detectable signal at the seat cushion, the housing having an edge-free surface and at least one housing opening, which is permeable to sound waves.

According to a third aspect of the present disclosure, a method for producing a seat cushion for a vehicle seat is provided. The method includes the following steps providing a vibration unit having at least one electrically controllable vibration device for generating vibrations. The method also includes a housing completely accommodating the at least one electrically controlled vibration device and configured to be arranged on the seat cushion of the vehicle seat such that the at least one electrically controllable vibration device is intended to generate a haptically detectable signal at the seat cushion, the housing having an edge-free surface and at least one housing opening, which is permeable to sound waves. The method also includes the steps of foaming and curing a plastic within a molding tool, and arranging at least one plastic pocket for accommodating the vibration unit within the molding tool such that it is largely embedded in the seat cushion and a pocket opening is integrated into an outer surface of the seat cushion or is arranged outside the seat cushion.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 1a is a schematic illustration of an exemplary embodiment of a seat cushion having a vibration unit shown in a first state;

FIG. 1b is a schematic illustration of an exemplary embodiment of the seat cushion shown in a second state;

FIG. 1c is a schematic illustration of an exemplary embodiment of the seat cushion shown in a third state;

DETAILED DESCRIPTION OF PREFERRED EMBODIMENTS

Figure 3:
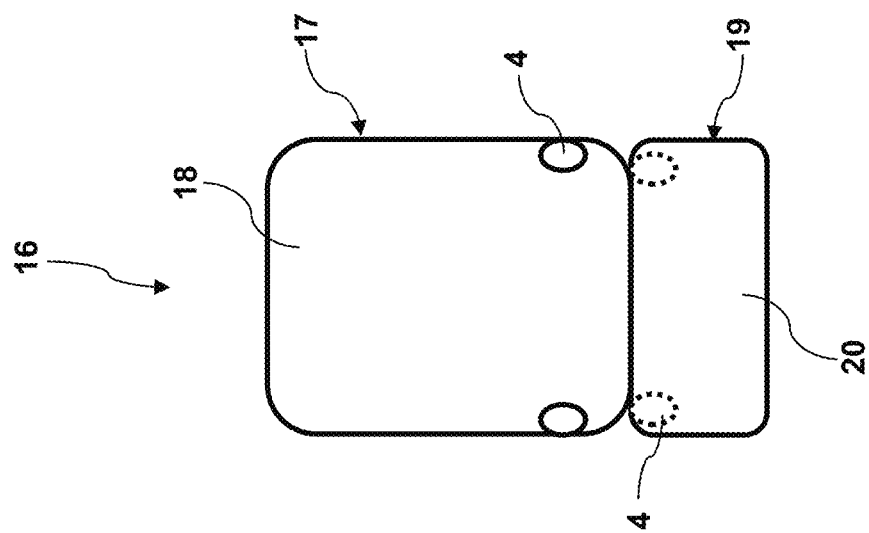
FIG. 3 is a schematic illustration of an exemplary embodiment for a vehicle seat having vibration units in the seat cushions.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

In the different figures, identical parts are always provided with the same reference signs, for which reason they are generally also only described once.

FIGS. 1a-1c show schematic illustrations of an exemplary embodiment for a seat cushion 1 according to the disclosure for a vehicle seat (not shown) in three different states. The vehicle seat may be for use in a motor vehicle, such as a wheeled motor vehicle for transporting one or more passengers, such as a sedan, truck, van, SUV, bus, for example.

The seat cushion 1 has a cushion section 2, which has been produced by foaming and curing a plastic within a molding tool (not shown). A plastic pocket 3 for accommodating a vibration unit 4 of the seat cushion 1 is arranged partially within the cushion section 2, in that the plastic pocket 3 has been arranged within the molding tool in such a way that it is largely embedded in the cushion section 2 and its pocket opening 5 is arranged outside the cushion section 2. In this case, the plastic pocket 3 may have been kept in an inflated state during foaming and curing of the plastic.

The plastic pocket 3 is formed by two plastic films 6 and 7, which are connected to one another in a materially bonded manner at the edge, while leaving the pocket opening 5, in such a way that there is a receiving space 8 for the vibration unit 4 in the center. For example, the two plastic films 6 and 7 can be thermally welded at the edge. If the vibration unit 4 is necessarily arranged completely within the receiving space 8, it is simultaneously completely embedded within the cushion section 2.

Two apertures 9 and two tabs 10, each having an aperture 9, are formed on the plastic pocket 3, wherein a section of the cushion section 2 passes through the respective aperture 9.

The vibration unit 4 for generating a haptically detectable signal at the seat cushion 1 has an electrically controllable vibration device (not shown) for generating vibrations. In addition, the vibration unit 4 has a cable connection 11, via which the vibration device can be electrically controlled. Wireless control of the wireless device is also conceivable.

Furthermore, the vibration unit 4 has a housing 12, in which the vibration device is completely accommodated. The housing 12 has an edge-free surface 13 and five housing openings 14, which are arranged in a W-shaped pattern and permeable to sound waves. The housing 12 may be configured as a triaxial ellipsoid or is kidney-shaped, according to various examples. The housing 12 has an edge-free surface and at least one opening, which is permeable to sound waves.

In the state shown in FIG. 1a, the vibration unit 4 is located outside the plastic pocket 3 or the cushion section 2. In the state shown in FIG. 1b, the vibration unit 4 has already been fitted partially into the plastic pocket 3. In the state shown in FIG. 1c, the vibration unit 4 has been fitted completely into the plastic pocket 3 or its receiving space 8.

Figure 2:
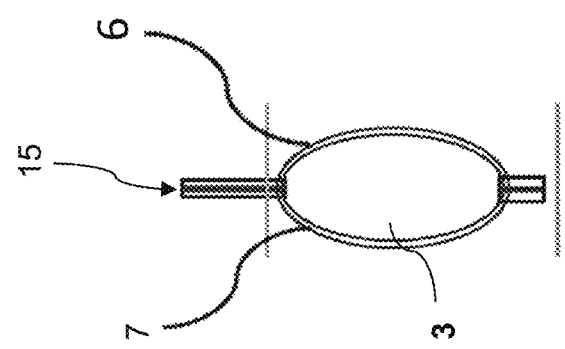
FIG. 2 is a schematic illustration of another exemplary embodiment of a plastic pocket adapting to the housing for a seat cushion.

FIG. 2 shows how the plastic pocket 3 is adapted, by way of example, to the configuration of the housing 12 after foaming and curing of the plastic. In an ideal embodiment, the plastic pocket 3 is designed such that it is media-tight at its aperture and/or tab 15, that is to say such that it can be reclosed at the pocket opening 5, with the result that it forms the cavity for the housing 12 during the foaming and curing of the plastic. To insert the housing 12 with the cable connection 11, the plastic pocket 3 becomes accessible by the opening of the reclosable tab, that is to say the pocket opening 5, with the result that the housing 12, that is to say the vibration unit 4, can be inserted easily into the cavity, that is to say into the plastic pocket 3. Thereafter, the plastic pocket 3 is reclosed, wherein the cable connection 11 is led out at least for power supply and/or for data connection. In the illustrated exemplary embodiment, the cable connection 11 is led laterally, on the right in the plane of the drawing, out of the housing 12 and the plastic pocket 3, and therefore the reclosable pocket opening 5 is adapted, in an ideal configuration, to the positioning of the cable connection 11 and the configuration of the housing 12.

FIG. 3 shows a schematic illustration of an exemplary embodiment for a vehicle seat 16 that may be used in a land vehicle (not shown). The vehicle seat 16 may be a driver seat or a passenger seat.

The vehicle seat 16 has a seatback 17 with a seat cushion 18 and a seat bottom 19 with a seat cushion 20. Two vibration units 4 are embedded in the seat cushion 18 laterally and in a lower region. The vibration units 4 can be designed according to the exemplary embodiment shown in FIGS. 1a-1c. Alternatively or in addition, two vibration units 4 can be embedded in the seat cushion 20 of the seat bottom 19 laterally and in a rear region, that is to say close to the seatback, this being indicated in FIG. 3 by dashed lines. The seat cushions 18 and 20 may have foam covered with an upholstered covering such as leather or fabric, for example.

According to the disclosure, a housing, a vibration unit, and seat cushion and method are provided, according to which the housing has an edge-free surface and at least one housing opening permeable to sound waves.

It should be noted that the features and measures presented individually in the following description can be combined with one another in any technically feasible manner and indicate further embodiments of the disclosure. The description additionally characterizes and specifies the disclosure, in particular in conjunction with the figures.

As set forth in this disclosure, it is possible to make available a vibration unit with an edge-free or smooth, for example completely rounded, surface, thereby enabling the vibration unit to be integrated into a seat cushion of a vehicle seat without the vibration unit being perceived as troublesome by a person sitting on the vehicle seat and without the seat cushion being damaged by relative movements between the seat cushion and the vibration unit.

In addition, on the basis of the disclosure, the vibration unit can be used for the simultaneous generation of a vibration signal and of an acoustic signal since, during the generation of vibrations, a vibration device arranged within the housing simultaneously also generates sound waves and these can emerge from the vibration unit through the at least one housing opening in order to become acoustically perceptible to a person sitting on the vehicle seat. It is thereby possible to simulate an engine start, for example. Various sound data can be used to produce desired vibrations and sounds. The sound data can be stored in a control unit, for example in a central control unit or a decentralized control unit, and can be retrieved individually or in a predeterminable manner. Thus, for example, the driving feel and the sound of a vehicle with an internal combustion engine, with the typical characteristics which are inherent in such a vehicle, can be imparted to a driver of a battery-electric vehicle or a vehicle driven in some other way.

The housing opening can be designed as a circular or polygonal aperture in the housing, for example. The housing opening can be arranged on a side of the housing which, in the case of an intended arrangement of the vibration unit on the vehicle seat, is arranged facing a seat bottom of the vehicle seat. The housing can also have two or more such housing openings, according to various examples.

The disclosure thus offers an occupant, in particular a driver, of a vehicle an acoustically and haptically perceptible and thus improved driving experience, and may do this using only a single device, namely the vibration unit, which is located on or in the vehicle seat and therefore in the vicinity of the body of the occupant. If a vibration unit is arranged adjacent to reinforcing elements, for example reinforcing wires of the vehicle seat, the transmission of vibrations and sound is made even better by the structure-borne sound.

The housing can be formed partially or completely from a plastic, in particular a fiber-reinforced plastic, a metal or a metal alloy. The housing can have at least two housing parts connected to one another. A receiving space for completely accommodating a vibration device for generating vibrations is formed within the housing.

According to one advantageous embodiment, the housing is designed as a triaxial ellipsoid or is kidney-shaped. This embodiment of the housing is associated with an edge-free or completely rounded surface of the housing.

The disclosure furthermore provides a vibration unit, which has a housing according to one of the above mentioned embodiments or a combination of at least two of these embodiments with one another, in which the vibration device is completely accommodated.

The advantages mentioned above in respect of the housing are correspondingly associated with the vibration unit. The electrically controllable vibration device can, for example, have at least one electric drive and an eccentric mass or weight which can be driven thereby.

The disclosure furthermore provides a seat cushion having at least one above mentioned vibration unit which is completely embedded within the seat cushion.

The advantages mentioned above in respect of the housing are correspondingly associated with the seat cushion. Placing the vibration unit within the seat cushion or a cushion section thereof, which can otherwise be formed, for example, from a foam, is a very good technical solution for arranging the vibration unit on the seat cushion.

The disclosure furthermore provides a method, according to which at least one plastic pocket for accommodating a vibration unit, in particular according to one of the above mentioned embodiments or a combination of at least two of these embodiments with one another, is arranged within the molding tool in such a way that it is largely embedded in the seat cushion, and its pocket opening is integrated into an outer surface of the seat cushion or is arranged outside the seat cushion. The seat cushion may be part of a seatback or a seat bottom of the vehicle seat.

By usage of the plastic pocket, a cavity accessible via the pocket opening, which is arranged on the surface of the seat cushion or outside the seat cushion, can be formed within the seat cushion to completely accommodate the vibration unit. In contrast, it may not be possible to place a conventional vibration unit within a conventional seat cushion on account of the conventional foaming process.

According to an advantageous embodiment, the plastic pocket is kept in an inflated state during foaming and curing of the plastic. As a result, a cavity is formed within the seat cushion, into which cavity the vibration unit can be fitted, for example, in a form-fitting manner.

According to a further advantageous embodiment, the plastic pocket is formed by two plastic films, which are connected to one another in a materially bonded manner at the edge while leaving a re-closable pocket opening, and it would be possible to carry out thermal welding of the two plastic films, although this is not intended to be restrictive. As a result, the plastic pocket can be produced in a simple manner. In addition, the shape of the plastic pocket can be adapted in a simple manner to the respective shape of the vibration unit.

According to a further advantageous embodiment, at least one aperture and/or at least one tab with at least one aperture are/is formed on the plastic pocket, wherein a section of the seat cushion passes through the respective aperture. In an ideal embodiment, the aperture and/or tab are/is designed such that they/it can be closed again, they/it being media-tight to such an extent that they/it remains in the inflated state during foaming and curing of the plastic. If the aperture and/or tab is opened after foaming and curing in order to insert the vibration unit into the cavity created, the cavity remains in its dimension formed by the plastic pocket, thus ensuring easy insertion of the vibration unit. After insertion, the plastic pocket is closed again. Media-tight reclosure elements are widely known, for which reason they will not be discussed further here.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vibration unit for generating a haptically detectable signal at a seat cushion of a vehicle seat, the vibration unit comprising:
   at least one electrically controllable vibration device for generating vibrations; and
   a housing completely accommodating the at least one electrically controlled vibration device and configured to be arranged within the seat cushion of the vehicle seat such that the at least one electrically controllable vibration device generates the haptically detectable signal at the seat cushion, the housing having an edge-free surface and at least one housing opening, wherein the at least one housing opening is permeable to sound waves, and wherein the housing is configured as a triaxial ellipsoid.

2. A vibration unit for generating a haptically detectable signal at a seat cushion of a vehicle seat, the vibration unit comprising:
   at least one electrically controllable vibration device for generating vibrations; and
   a housing completely accommodating the at least one electrically controlled vibration device and configured to be arranged within the seat cushion of the vehicle seat such that the at least one electrically controllable vibration device generates the haptically detectable signal at the seat cushion, the housing having an edge-free surface and at least one housing opening, wherein the at least one housing opening is permeable to sound waves, and wherein the housing is configured as kidney-shaped.

3. A seat cushion for a vehicle seat, the seat cushion comprising:
   at least one electrically controllable vibration device for generating vibrations; and
   a housing completely accommodating the at least one electrically controlled vibration device and configured to be arranged within the seat cushion of the vehicle seat such that the at least one electrically controllable vibration device generates a haptically detectable signal at the seat cushion, the housing having an edge-free surface and at least one housing opening, wherein the at least one housing opening is permeable to sound waves, wherein the housing is configured as one of a triaxial ellipsoid and kidney-shaped.

4. The seat cushion for a vehicle seat according to claim 3, wherein the housing is configured as a triaxial ellipsoid.

5. The seat cushion for a vehicle seat according to claim 3, wherein the housing is configured as kidney-shaped.

6. The seat cushion for a vehicle seat according to claim 3, wherein the seat cushion is for a lower portion of the vehicle seat.

* * * * *